United States Patent [19]

Bawel

[11] 3,750,419

[45] Aug. 7, 1973

[54] CONTROL CIRCUITS FOR ABSORPTION REFRIGERATION MACHINE

[75] Inventor: Fred W. Bawel, Boonville, Ind.

[73] Assignee: Arkla Industries, Inc., Evansville, Ind.

[22] Filed: Aug. 11, 1971

[21] Appl. No.: 170,776

Related U.S. Application Data

[62] Division of Ser. No. 16,021, March 3, 1970, Pat. No. 3,616,390.

[52] U.S. Cl. .................................... 62/141, 62/476
[51] Int. Cl. ............................................ F25b 15/06
[58] Field of Search ...................... 62/141, 476, 494

[56] References Cited
UNITED STATES PATENTS

| | | | |
|---|---|---|---|
| 3,561,227 | 2/1971 | Swearingen | 62/476 X |
| 3,054,272 | 9/1962 | Leonard, Jr. | 62/141 X |
| 3,122,002 | 2/1964 | Miner et al. | 62/141 |
| 3,426,547 | 2/1969 | Foster | 62/141 X |

Primary Examiner—William F. O'Dea
Assistant Examiner—Peter D. Ferguson
Attorney—Cushman et al.

[57] ABSTRACT

In an absorption refrigerating machine, such as a salt absorption type of machine, control of the temperature in the refrigerant flash chamber is effected by bypassing absorbent around the absorber when the chamber temperature approaches the freezing temperature. Concentration of the salt solution is controlled by withdrawing refrigerant from the circuit into a chamber and dumping the refrigerant into the absorber circuit when there is a drop in the temperature of the cooling water entering the absorber. The heat input to the refrigerant generator is controlled in accordance with the load on the machine as determined by measuring the temperature of the chilled water entering and leaving the evaporator.

5 Claims, 1 Drawing Figure

PATENTED AUG 7 1973
3,750,419
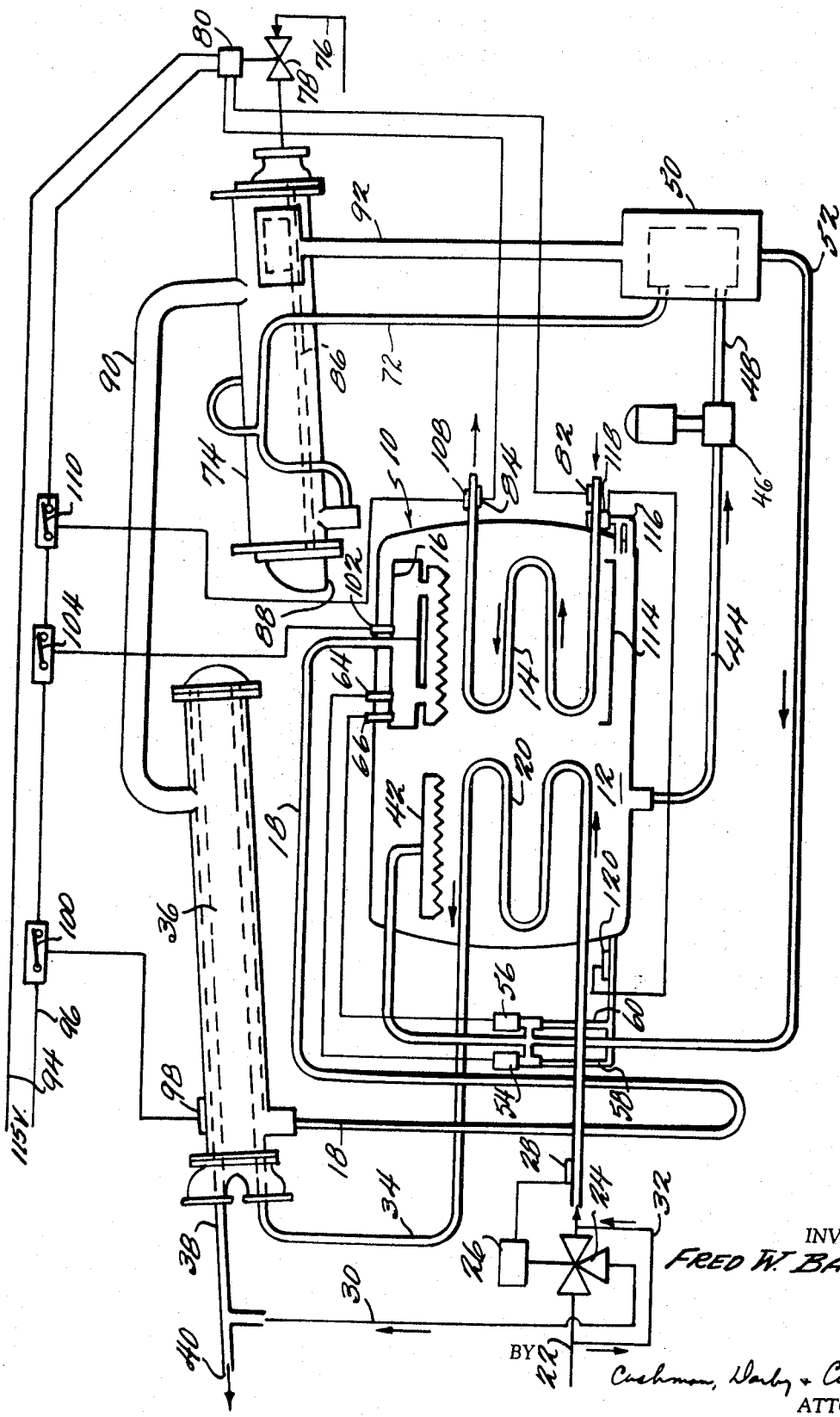
INVENTOR
FRED W. BAWEL
BY
Cushman, Darby & Cushman
ATTORNEYS

CONTROL CIRCUITS FOR ABSORPTION REFRIGERATION MACHINE

This is a division of application Ser. No. 16,021, filed Mar. 3, 1970 and now U.S. Pat. No. 3,616,390.

This invention relates to an absorption type of refrigerating machine and in particular to the control of flash chamber temperature, absorbent solution concentration and heat input to the refrigerant generator.

An absorption type of refrigerating machine includes, as its major parts, a heated refrigerant vapor generator in which refrigerant vapor is driven off from an absorbent solution, a condenser for condensing the refrigerant vapor, an evaporator in which the condensed refrigerant is vaporized to absorb heat from, for example, a stream of chilled water, and an absorber in which the vaporized refrigerant is re-absorbed into the absorbent solution. Heat for generating refrigerant vapor is obtained from any available source, such as steam, hot water or gas. The condensing fluid may be a stream of cooling water which is also employed for removing the heat generated in the absorber during the absorption step.

The present invention contemplates a system of controls over various variables in a refrigerating machine of this type. It is one object to provide control of the temperature of the vaporizing refrigerant in the flash chamber of the evaporator in order to prevent freezing of the refrigerant during startup or during periods of light load or when the supply of cooling water is at low temperature. This control is accomplished by bypassing absorbent liquid around the absorber when flash chamber temperature drops in order to allow the evaporator to become saturated with refrigerant.

Another object of the present invention is to control the concentration of the absorbent liquid, when cooling water temperature drops, by increasing the refrigerant content of the absorbent liquid. This may be accomplished by storing a portion of refrigerant liquid, obtained from the evaporator and dumping it into the absorbent circuit when the temperature of the cooling water drops.

A further object is to control the heat input into the refrigerant generator in accordance with the temperatures of both the chilled water entering and leaving the evaporator in order to reduce cycling when the load on the machine changes. In the preferred type of control the temperatures of both the entering and leaving chilled water are measured with resistance bulbs and the resulting voltage signals are combined in a bridge circuit when weights the authority of the leaving water temperature.

The invention will be further understood from the following detailed description of an illustrative embodiment taken with the sole FIGURE which is a schematic view of an absorption refrigerating machine embodying the principles of the present invention. For purposes of illustration the refrigerant may be considered as being water and the absorbent may be considered as being an aqueous solution of lithium bromide.

Referring to the drawing it will be seen that the illustrated machine includes a combined evaporator-absorber 10 in the form of a shell 11 defining a chamber 12. A coil 14 is located within the evaporator portion of the chamber 12 for passing a medium, such as water, which is to be chilled. A flash chamber 16, which may be of conventional construction, is located within the chamber 12 and is coupled to a refrigerant line 18 from the condenser 36. Refrigerant entering the flash chamber 12 is at condenser temperature and boils or flashes when subjected to the lower pressure in the evaporator. A small amount, 4–6 percent, of the refrigerant vaporizes, cooling the remainder to the temperature in equilibrium with the absorber (or evaporator) pressure. The liquid refrigerant is then distributed over the evaporator tubes where it evaporates and cools the water in the coils 14.

A cooling coil 20 is located in the absorber portion of the chamber 12 and is adapted to receive cooling water from an input line 22 through a condensing water by-pass valve 24. The by-pass valve is controlled by a switch 26 actuated by a temperature sensor 28 located at the inlet end of the coil 20. When the incoming cooling water temperature decreases, the by-pass valve 26 is caused to move to a by-pass position so that part of the cooling water is by-passed around the coil 20 via a line 30. The switch 26 is associated with the temperature sensor 28 in such a way as to cause all of the cooling water to flow into the absorber coil 20 when the condensing water temperature rises. In addition, a fixed by-pass line 32 is provided around the condensing water by-pass valve 24 so that a predetermined minimum amount of condensing water always passes into the coil 20. The output of the coil 20 passes to a line 34 which feeds into a refrigerant condenser 36. An output line 38 from the condenser 36 merges with the line 30 from the condenser water by-pass valve 24 to form a line 40 which passes to, for example, a cooling tower (not shown).

A conventional absorber distribution dripper or spray head 42 is located within the absorber portion of the chamber 12 so as to pass the absorbent saline solution over the cooling coil 20. The refrigerant vapor from the flash chamber 16 and the evaporator 14 is simultaneously absorbed into the saline solution, and the heat which is generated is transferred into the cooling water passing through the coil 20. The weak absorbent solution, which is now relatively high in refrigerant content is withdrawn from the absorber-evaporator 10 via a line 44 and by means of a solution pump 46. An output line 48 from the pump 46 passes into a heat exchanger 50 in which the weak absorbent liquid passes in indirect heat exchange with warm strong absorbent liquid obtained from a refrigerant generator 74. The weak liquid then passes to the absorber spray head 41 via a line 52.

Two by-pass valves 54 and 56 are located in fluid communication with respect to the line 52. Each of these valves may be a hermetic, off-on solenoid valve operable to open and close in response to first and second electrical signals, and each valve is provided with a respective output line 58 and 60 which merge into a common line 62 that communicates with the lower portion of the chamber 12. The by-pass valves are in electrical circuit, respectively, with two flash chamber temperature sensors 64 and 66 so that the temperature within the flash chamber controls the opening and closing of the valves and hence the flow of strong absorbent to the spray head. During operation flow is decreased by opening one of the valves upon a decrease in flash chamber temperature and subsequently opening the other valve upon a further decrease in flash chamber temperature.

A line 72 conveys weak absorbent solution from the heat exchanger 50 to the generator 74. A steam input line 76 is connected to the generator via a main steam valve 78 which is controlled by an electronic network 80. This network may be a conventional bridge and amplification circuit such as in manufactured by Barber Colman under the designation Dual Bridge CP 5154–161. The network is electrically coupled to temperature sensors 82 and 84 located to respectively measure the temperatures of the chilled water passing into and out of the coil 14. The steam entering through a line 76 passes through the generator 74 via tubes 86, and the condensate formed is discharged at a discharge outlet 88.

The generator 74 vaporizes refrigerant from the weak absorption liquid, and the resulting refrigerant vapor passes to the condensor 36 by way of a line 90. Simultaneously, the resulting strong absorbent liquid, which is relatively low in water content, passes from the genrator 74 and into the output line 92 for ultimate delivery to the absorber head 42 by way of the heat exchanger 50. The refrigerant vapor is condensed in the condenser 36 by indirect heat exchange with the cooling water entering through the line 34.

Conventional power lines 94 and 96 are electrically coupled to the network 80, which controls the actuation of the steam valve 78. A high temperature sensor 98 is associated with the condenser 36 and is electrically coupled with a condenser high temperature switch 100 located in series circuit with respect to the network 80 and the lines 94 and 96. When the condenser temperature rises to a predetermined level, e.g., 115° ± 1°F, the switch 100 is caused to open in a conventional manner by the sensor 98 so that the machine is turned off and the main steam valve 78 is closed to prevent further entry of steam into the generator 74. Another heat sensor 102 is located at least partially within the flash chamber 16 and is electrically coupled to a low temperature control switch 104 that is in series circuit with respect to the network 80 and the lines 94 and 96. When the flash chamber temperature falls to a predetermined level, e.g., 32.5° ± 0.5°F, the switch 104 is opened so that the machine is turned off and steam is prevented from entering the generator 74. When the flash chamber temperatures rises to a predetermined temperature, e.g., 40° ± 2°F, the switch 104 is caused to close so that the machine is again started and steam is passed through the main steam valve 78. A further temperature sensor 108 is located at the exit portion of the evaporator coils 14 and is in electrical circuit with a chilled water low temperature control switch 110. Thus, when the chilled water temperature passing through the coil 14 and exiting therefrom falls to a predetermined temperature, e.g., 38° ± 0.5°F, the sensor 108 opens the switch 110 to turn off the machine and to prevent steam from passsing into the generator 74. When the temperature of the chilled water as sensed by the sensor 108 rises to a predetermined temperature, e.g., 45° ± 2°F, the switch 110 is then caused to be closed so that the machine is turned on and the steam is again permitted to pass through the main valve 78.

A further arrangement (not shown) may be utilized whereby a flow sensor can be placed into the chilled water tube 14 to be in electrical circuit with respect to a switch located in series circuit with the network 80 and the lines 94 and 96. When the chilled water flow falls below a predetermined level, e.g., 170 gpm, the sensor can activate the switch so as to turn off the machine and to prevent steam from entering the generator 74. When the flow through the coils 14 increases to a predetermined level, e.g., 180 gpm, the switch can be closed so as to turn the machine on and to again permit steam to pass into the generator 74.

In order to maintain operation of the machine when cooling water temperature drops, the absorbent solution must be made richer in refrigerant, that is the salt solution must be diluted with water. The apparatus for accomplishing this includes a concentration control chamber in the form of a tray-like structure 114 located in the evaporator section of the absorber-evaporator 10 in a position below the evaporator so as to collect and store a portion of the liquid refrigerant. The stored refrigerant can be returned to the circuit by gravity through a line 116 and a solenoid valve 118. The latter is normally closed but will open upon the occurrence of a predetermined low temperature as measured by a temperature sensor 120 associated with the inlet end of the absorber cooling coil 20. Upon an increase in cooling water temperature the electrical signal from the sensor 120 will cause the valve 118 to close.

OPERATION

The overall operation of the machine is conventional and requires only a general description. Refrigerant vapor (water vapor) is obtained from the generator 74 upon indirect heating of the salt solution therein by the steam entering through the valve 78. The refrigerant vapor passes through the line 90 to the condenser 36 where it is condensed at high pressure by passing in indirect heat exchange with cooling water which enters through the line 34. The refrigerant liquid passes to the evaporator section of the combined absorber-evaporator 10 where it evaporates at low pressure thereby absorbing heat from the chilled water passing through the chilled water coil 14. The vaporized refrigerant directly contacts and is absorbed into absorbent liquid which issues from the spray head 42 within the absorber section of the combined absorber-evaporator 10. Heat liberated during the absorption step is transferred into the stream of cooling water passing through the coil 20 over which the absorbent liquid flows.

The absorbent liquid, now rich in refrigerant, collects in the bottom of the absorber-evaporator 10 and is drawn off by the solution pump 48 for return to the generator 74 by way of the heat exchanger 50. Absorbent liquid from the generator 74, weak in refrigerant, passes through the heat exchanger 50 to the absorber-evaporator 10 where it is sprayed from the spray head 42 into contact with refrigerant vapor.

Referring now to the control features which are embodied in the present invention, attention is first directed to the control of flash chamber temperature by means of the solution by-pass valves 54 and 56 which are located in the absorber line 52 at a point below the inlet to the spray head 42. On start up of the machine both valves 54 and 56 are open, so that all the absorbent flows through the lines 58, 60 and 62 thereby allowing the evaporator to become saturated with refrigerant. A timing circuit (not shown) is provided to close the valves after a short time period. For example, the timing circuit may operate to close one valve after about 5 minutes, say, 3½ minutes, and to close the other valve after about 10 minutes, say, 7 minutes. This provides full absorbent flow to the absorber section, and at this time the control of the valves will be taken over by the temperature sensors 64 and 66 and the associated circuitry which is adapted to open and close each valve independently of the other in accordance with predetermined low and high temperatures, respectively.

On conditions of light load or cold cooling water one valve, e.g. valve 54, which will handle approximately one-half of the total volume of absorbent, is opened as the flash chamber drops to, for example 37°–38°F. If the flash chamber temperature continues to drop, the valve 56 opens at for example 36°–35°F. The result of this operation is to by-pass all absorbent around the absorber thus reducing the refrigeration effect, preventing a freeze up of the refrigerant in the flash chamber and causing the flash chamber temperature to increase. As the chamber temperature increases to 37°–38°F the valve 56 closes thus allowing approximately one-half of the solution to flow to the absorber. As the chamber temperature increases to 39°–40°F the valve 54 closes thus passing all the solution to the absorber. During the by-pass time capacity of the machine is not immediately reduced because of the solution present in the absorber, but the flash chamber temperature does respond very rapidly.

A drop in the temperature of the cooling water entering the absorber cooling coil to, for example, 72.5°F, might cause the evaporator temperature to drop to the freezing point of the water. To prevent this the valve 118 opens with the result that the refrigerant liquid in the tray-like structure 114 is dumped back into the bottom of the absorber-evaporator 10 thereby increasing the refrigerant content of the absorbent solution. The increased dilution raises the vapor pressure of the solution and hence the boiling point of the refrigerant.

Heat input to the machine is reduced or increased depending on the load present to the machine by means of the control system 80,82,84 associated with the steam valve 78. The valve 78 is adjusted to be full open when, for example, chilled water temperature entering the evaporator section is 54°F and leaving chilled water temperature is 44°F, assuming that this temperature spread represents full load. When the entering water temperature drops to 50°F and the leaving water temperature drops to 40°F the control system modulates the valve 78 to cut back the heat input to slightly less than 50 percent. Preferably the control system employs resistance bulbs as the sensors 82 and 84 and the resulting voltage signals are fed to a bridge and amplification circuit, such as manufactured by Barber Colman, which produces a control voltage signal which is a function of both temperature signals with the temperature signal from the leaving chilled water having a greater effect than the temperature signal from the entering water. Accordingly the valve 78 will begin to open upon an increase in the temperature of either the entering or leaving chilled water temperature, and for a given increase in temperature will open to a greater extent when that increase occurs in the leaving water temperature.

What is claimed is:

1. A refrigeration machine of the absorption type comprising a refrigerant vapor generator, a refrigerant condenser, a refrigerant evaporator, an absorber having an absorbing portion wherein vaporized refrigerant is absorbed into an absorbent solution, and an absorbent circuit including strong-absorbent conduit means for transferring absorbent solution weak in refrigerant from the generator to the absorbing portion of the absorber and conduit means for transferring absorbent solution rich in refrigerant from the absorber to the generator, the improvement which comprises control means for controlling the temperature of the refrigerant in said evaporator so as to prevent freezing of refrigerant liquid therein, said control means including temperature responsive means for controlling the flow of absorbent solution from the generator to the absorbing portion of the absorber, said flow control means being operable to reduce the flow upon the occurrence of a predetermined low temperature in the evaporator and to restore the flow upon the occurrence of a predetermined higher temperature in the evaporator.

2. Apparatus as in claim 1 wherein said control means includes at least one by-pass valve in the strong absorbent conduit means operable when open to by-pass at least a portion of the strong absorbent solution past the absorbing portion of the absorber and further includes a temperature-responsive device for opening said by-pass valve upon the occurrence of a predetermined low temperature in said evaporator.

3. A refrigeration machine of the absorption type comprising a refrigerant vapor generator, a refrigerant condenser, a refrigerant evaporator, an absorber having an absorbing portion wherein vaporized refrigerant is absorbed into an absorbent solution, and an absorbent circuit including strong-absorbent conduit means for transferring absorbent solution weak in refrigerant from the generator to the absorbing portion of the absorber and conduit means for transferring absorbent solution rich in refrigerant from the absorber to the generator, the improvement which comprises by-pass means including at least one by-pass valve for by-passing at least a portion of the absorbent solution flowing through said strong-absorbent conduit means pass said absorbing portion of said absorber so as to be mixed with absorbent solution which has passed through said absorbing portion.

4. A refrigeration machine as in claim 3 wherein said conduit means for transferring absorbent solution rich in refrigerant extends directly between said absorber and said generator and includes an absorbent solution pump, wherein said strong-absorbent conduit means extends directly from said generator to said absorbing portion of said absorber, and wherein said by-pass valve is connected between said two conduit means at a location upstream of said solution pump.

5. A refrigeration machine of the absorption type comprising a refrigerant vapor generator; a refrigerant condenser; a refrigerant evaporator; an absorber having an upper portion wherein vaporized refrigerant is absorbed into an absorbent solution and a lower portion; and an absorbent circuit including strong absorbent conduit means for transferring absorbent solution weak in refrigerant from the generator to the upper portion of the absorber and weak absorbent conduit means separate from said strong absorbent conduit means for transferring absorbent solution rich in refrigerant from the lower portion of the absorber to the generator; and control means for controlling the temperature of the refrigerant in said evaporator so as to prevent freezing of refrigerant liquid therein, said control means including means for sensing the temperature in the evaporator and valve means in said strong absorbent conduit means responsive to said sensing means to bypass at least a portion of the strong absorbent from said strong absorbent conduit means past said upper portion of said absorber upon the occurrence of a predetermined low temperature in the evaporator and to restore full flow of strong absorbent to said upper portion upon the occurrence of a predetermined high temperature in the evaporator.

* * * * *